(12) United States Patent
Mohan et al.

(10) Patent No.: US 8,589,088 B2
(45) Date of Patent: Nov. 19, 2013

(54) GIS ENABLED PIPELINE UPGRADING SYSTEM

(75) Inventors: Vinoth Kumar Mohan, Hitec (IN); Kavitha Andoji, Hitec (IN); Christophe Faucherand, Cambridgeshire (GB)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 12/942,587

(22) Filed: Nov. 9, 2010

(65) Prior Publication Data

US 2012/0116692 A1    May 10, 2012

(51) Int. Cl.
*G06F 11/30*    (2006.01)
*G06F 17/40*    (2006.01)
*G06F 19/00*    (2011.01)

(52) U.S. Cl.
USPC .......... 702/34; 73/865.8; 73/865.9; 73/866.3; 340/540; 340/679; 702/182; 702/184; 702/187; 702/189; 705/305; 708/200

(58) Field of Classification Search
USPC .......... 73/86, 87, 432.1, 865.8, 865.9, 866.3; 340/500, 540, 679; 702/1, 33, 34, 35, 702/127, 182, 183, 184, 187, 189; 705/1.1, 705/7.11, 7.38, 305; 708/100, 105, 200

IPC .............. B06S 1/00; G01B 21/00,21/02, 21/08; G01D 7/00; G01M 99/00; G06F 11/00, 11/30, G06F 11/32, 17/00, 17/40, 19/00; G06Q 99/00
See application file for complete search history.

(56) References Cited

U.S. PATENT DOCUMENTS

| | | | |
|---|---|---|---|
| 3,228,236 A * | 1/1966 | Landrum et al. ................... 73/86 |
| 3,362,217 A * | 1/1968 | Rush et al. ................. 73/112.01 |
| 5,577,528 A | 11/1996 | Saha et al. |
| 8,141,592 B2 * | 3/2012 | Rice ................................ 138/99 |
| 2006/0118191 A1* | 6/2006 | Rice ................................ 138/99 |
| 2007/0154270 A1 | 7/2007 | Waddell et al. |
| 2011/0202275 A1* | 8/2011 | Beisel et al. ...................... 702/6 |

* cited by examiner

*Primary Examiner* — Edward Cosimano
(74) *Attorney, Agent, or Firm* — Sutherland Asbill & Brennan LLP

(57) ABSTRACT

Certain embodiments of the invention may include systems and methods for evaluating pipeline using GIS data. According to an example embodiment of the invention, a method is provided for evaluating pipeline using geographical information system (GIS) data. The method can include receiving component information from a GIS database for one or more components in a pipeline; determining a modified maximum allowable operating pressure (MAOPm) for the one or more components; determining an uprating pressure (MAOPm*) that the one or more components can withstand; and outputting a upgrade recommendation or an uprate recommendation based at least in part on the MAOPm and the MAOPm*.

20 Claims, 3 Drawing Sheets

GIS ENABLED PIPELINE UPGRADING SYSTEM

FIELD OF THE INVENTION

This invention generally relates to pipelines, and in particular, to evaluating pipeline components using geographical information system (GIS) data.

BACKGROUND OF THE INVENTION

Natural gas suppliers typically utilize a network of pipelines to deliver fuel to the customer premises. Utilities and pipeline companies have realized that capacity may be increased and more customers may be served by increasing the pressure of the gas within the pipeline. However, the components associated with the pipeline (pipes, joints, valves, meters, etc.) are typically rated to withstand a certain maximum allowable operating pressure (MAOP), and therefore, the number of customers that can be served from a particular pipeline may be limited by the components with the lowest MAOP rating. In some instances, the components of a pipeline can be evaluated and may have a high enough MAOP to allow the pressure in the pipeline be increased with minimal physical modification and at a minimal cost. However, such uprating usually requires the utility or pipeline owner to perform expensive manual inspections to assess all of the pipeline components and features, check the current regulation requirements, conduct assessment to identify population density or building proximity, and assess which components should be repaired or replaced in order to safely increase the pressure within the pipeline.

BRIEF SUMMARY OF THE INVENTION

Some or all of the above needs may be addressed by certain embodiments of the invention. Certain embodiments of the invention may include systems and methods for evaluating pipeline using GIS data.

According to an example embodiment of the invention, a method is provided for evaluating a pipeline using geographical information system (GIS) data. The method can include receiving component information from a GIS database for one or more components in a pipeline; determining a modified maximum allowable operating pressure (MAOPm) for the one or more components; determining an uprating pressure (MAOPm*) that the one or more components can withstand; and outputting at least one of an upgrade recommendation or at least one of an uprate recommendation based at least in part on the MAOPm and the MAOPm*.

According to another example embodiment, a system is provided for evaluating pipeline using geographical information system (GIS) data. The system can include at least one memory for storing data and computer-executable instructions. The system can also include at least one processor configured to access the at least one memory and further configured to execute the computer-executable instructions for receiving component information from a GIS database for one or more components in a pipeline, determining a modified maximum allowable operating pressure (MAOPm) for the one or more components, determining an uprating pressure (MAOPm*) that the one or more components can withstand, and outputting at least one of an upgrade recommendation or an uprate recommendation based at least in part on the MAOPm and the MAOPm*.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
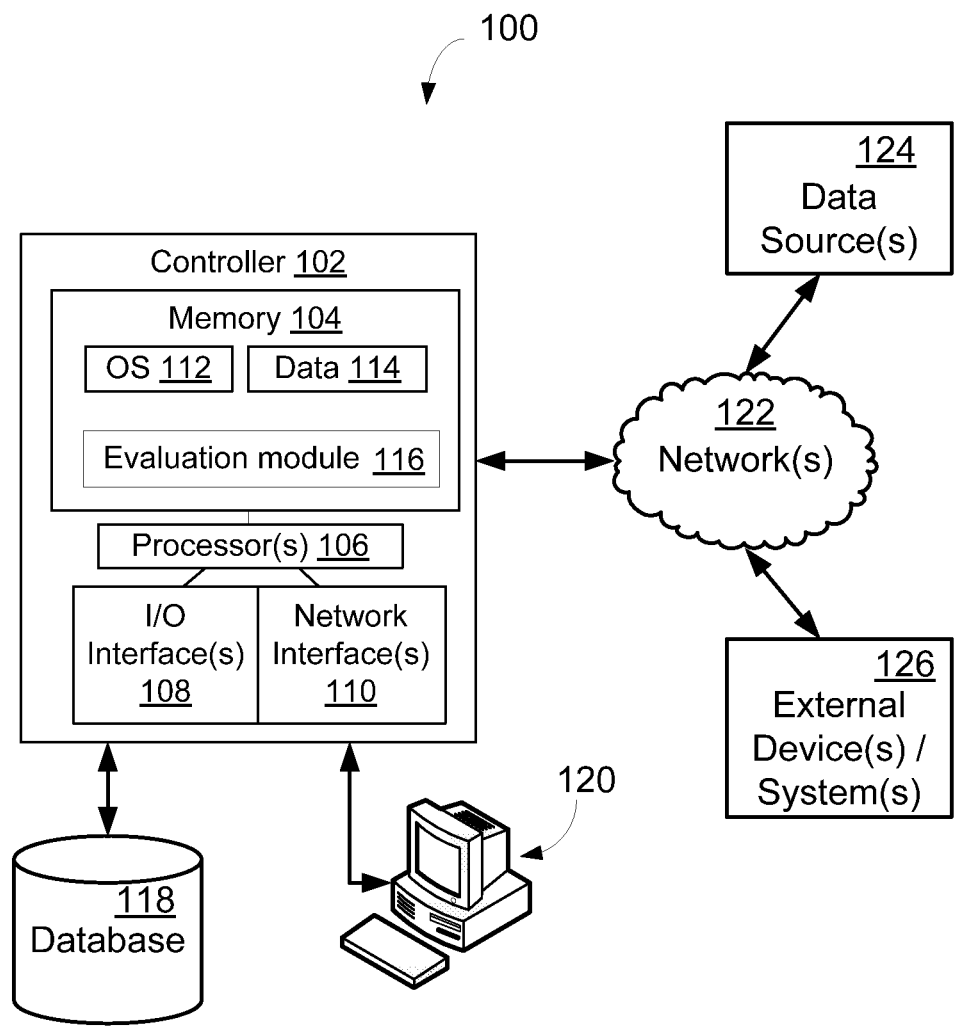
FIG. 1 is a block diagram of an illustrative GIS enabled pipeline evaluation system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable an evaluation of pipeline to determine if certain components associated with the pipeline should to be replaced (or upgraded) to meet higher operating pressure targets. Certain embodiments of the invention may also enable an evaluation of pipeline to determine the maximum allowable operating pressure that the pipeline can be safely uprated in order to meet higher operating pressure targets. According to example embodiments of the invention, the term "pipeline" may refer to any fluid or gas conveying system.

According to certain example embodiments, utilities and/or pipeline companies may utilize embodiments of the inventions in their decision to uprate and/or upgrade pipeline components by making use of geospatial data of pipeline assets and their associated attribute data. For example, a prediction algorithm may compute a component's altered specified minimum yield strength (SMYSM) based on the corrosion rate of the pipe, and the altered maximum allowable operating pressure (MAOPM) based on SMYSM. According to example embodiments, the prediction algorithm may provide recommendations for either uprating or upgrading the pipe component.

According to an example embodiment of the invention, comparisons can be made among operating parameters and utility defined business rules to determine if a particular action would be beneficial, for example, in terms of costs vs. benefits. In an example embodiment, a segmentation function may be utilized to identify pipeline components or sections that (i) can be uprated (ii) require upgrading and (iii) need additional information for the algorithm to make a decision. According to an example embodiment, past fault history may be considered in the analysis.

According to example embodiments, a utility company may consider uprating their existing network when a need arises to expand the network or add new customers. In example embodiments, compliance with regulatory requirements may be necessary. According to example embodiments, an evaluation process or algorithm may utilize a geographical information system (GIS) to help determine the financial impact to the utility. In example embodiments of the invention, certain factors and information may be tracked or gathered for use with the evaluation process or algorithm. For example, the factors or information may include, but are not limited to, corrosion rate, age, materials, frequency of inspection, identification of weak assets/points, identification of critical assets, and replacement costs. According to example embodiments, the algorithm may utilize other structural, environmental, and/or fault data. In an example embodiment, the utility may add rules to fine tune the algorithm as per its requirements.

According to an example embodiment of the invention, the method or process for determining upgrade or uprate recommendations may include receiving or determining corrosion rates for assets in a region of interest. In an example embodiment, the pipeline asset's pipe thickness estimate after corrosion, for example, may be based on initial specifications of the asset and the corrosion rate. In other embodiments, field data may provide confirmation of this estimate.

Various processors, databases, networks, and processes for determining recommendations for uprating or upgrading a pipeline, according to example embodiments of the invention, will now be described with reference to the accompanying figures.

FIG. 1 illustrates an example a GIS enabled pipeline evaluation system 100. According to example embodiments of the invention, the system 100 may include a controller, a database 118, a data input device, display and/or alert processor 120, one or more networks 122, external devices/system 126 and other data sources 124. In an example embodiment, the controller 102 may include a memory, one or more processors 106, one or more input/output interfaces 108, and/or one or more network interfaces 110. In an example embodiment, the memory 104 may include an operating system 112, data 114, and one or more evaluation modules 116.

Figure 2:
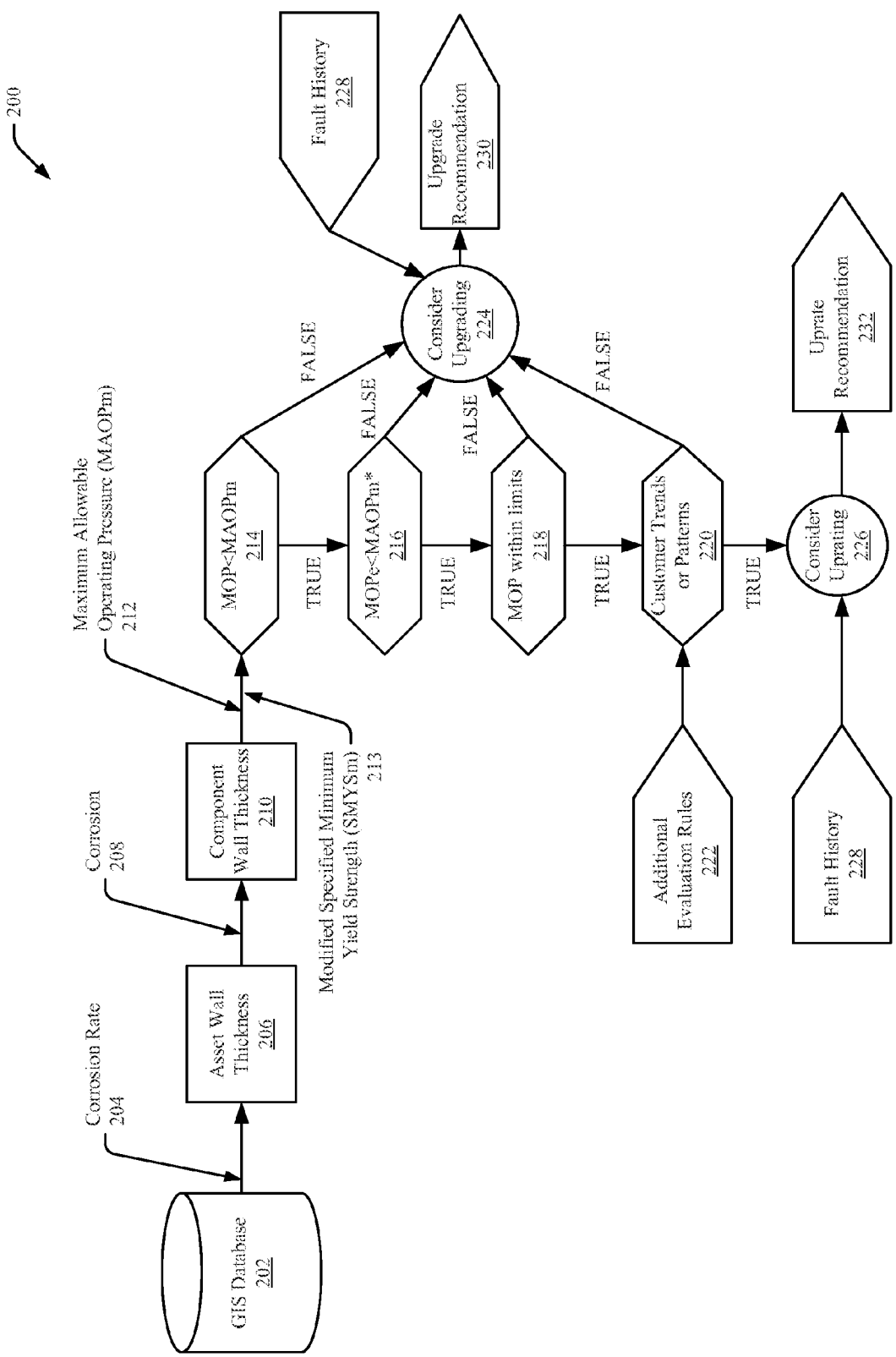
FIG. 2 is a block diagram of an illustrative pipeline evaluation process, method, or flowchart, according to an example embodiment of the invention.

FIG. 2 illustrates an example process for determining a particular recommendation for the pipeline components, according to an example embodiment of the invention. The process shown in FIG. 2 may be carried out, for example, by the one or more evaluation modules (such as 116 in FIG. 1). In an example embodiment, a GIS database 202 may be utilized for storing and retrieving attributes and/or factors related to the pipeline assets. In an example embodiment, the pipeline evaluation process 200 may receive a measured or estimated corrosion rate 204 for the pipeline assets. In an example embodiment, the asset wall thickness 206 may be determined based at least in part on the corrosion rate 204 and a resulting thickness of pipe 210 after corrosion 208 may be determined.

According to an example embodiment, the required yield strength and/or the required maximum operating pressure (MOP) of the pipeline asset may be determined based on the required pressure within the pipeline to meet the target expansion goals or desired customer base. In an example embodiment, after corrosion 208 has been taken into account, a modified maximum allowable operating pressure (MAOPm) 212 for the pipeline asset may be determined. According to an example embodiment, if MOP<MAOPm 214 is false, then the evaluation may be directed to consider upgrading 224. In an example embodiment, a fault history 228 may be further evaluated before an upgrade recommendation 230 is output. If, on the other hand, the evaluation MOP<MAOPm 214 is true, additional evaluations may utilized to determine the best recommendation. For example, an expected maximum operating pressure (MOPe) may be determined to represent a worst-case scenario for pressure in the pipeline. Additionally, a modified maximum allowable operating pressure (MAOPm*) may be calculated based on an uprated percentage of a modified specified minimum yield strength (SMYSm) 213, which may take into account the thickness of the pipe 210 after corrosion 208. In an example embodiment, if MOPe<MAOPm* 216 is false, then the evaluation may be directed to consider upgrading 224. In an example embodiment, a fault history 228 may be further evaluated before an upgrade recommendation 230 is output. If, on the other hand, the evaluation MOPe<MAOPm* 216 is true, additional evaluations may utilized to determine the best recommendation.

According to example embodiments of the invention, the pipeline evaluation process 200 may also consider if a predicted maximum operating pressures of weak assets are within prediction limits 218. If not, then the evaluation may be directed to consider upgrading 224. In an example embodiment, a fault history 228 may be further evaluated before an upgrade recommendation 230 is output. According to example embodiments of the invention, additional rules 222 may be utilized for evaluating whether customer trends or patterns 220 would necessitate considering upgrading 224.

In an example embodiment, if one or more of MOP<MAOPm 214 is true, MOPe<MAOPm* 216 is true, weak assets are within prediction limits 218, rules 222 analysis indicates safe customer trends or patterns 220, and the fault history 228 is within certain limits, then the pipeline evaluation process 200 may consider uprating 226 and provide an uprate recommendation 232 as the output.

Figure 3:
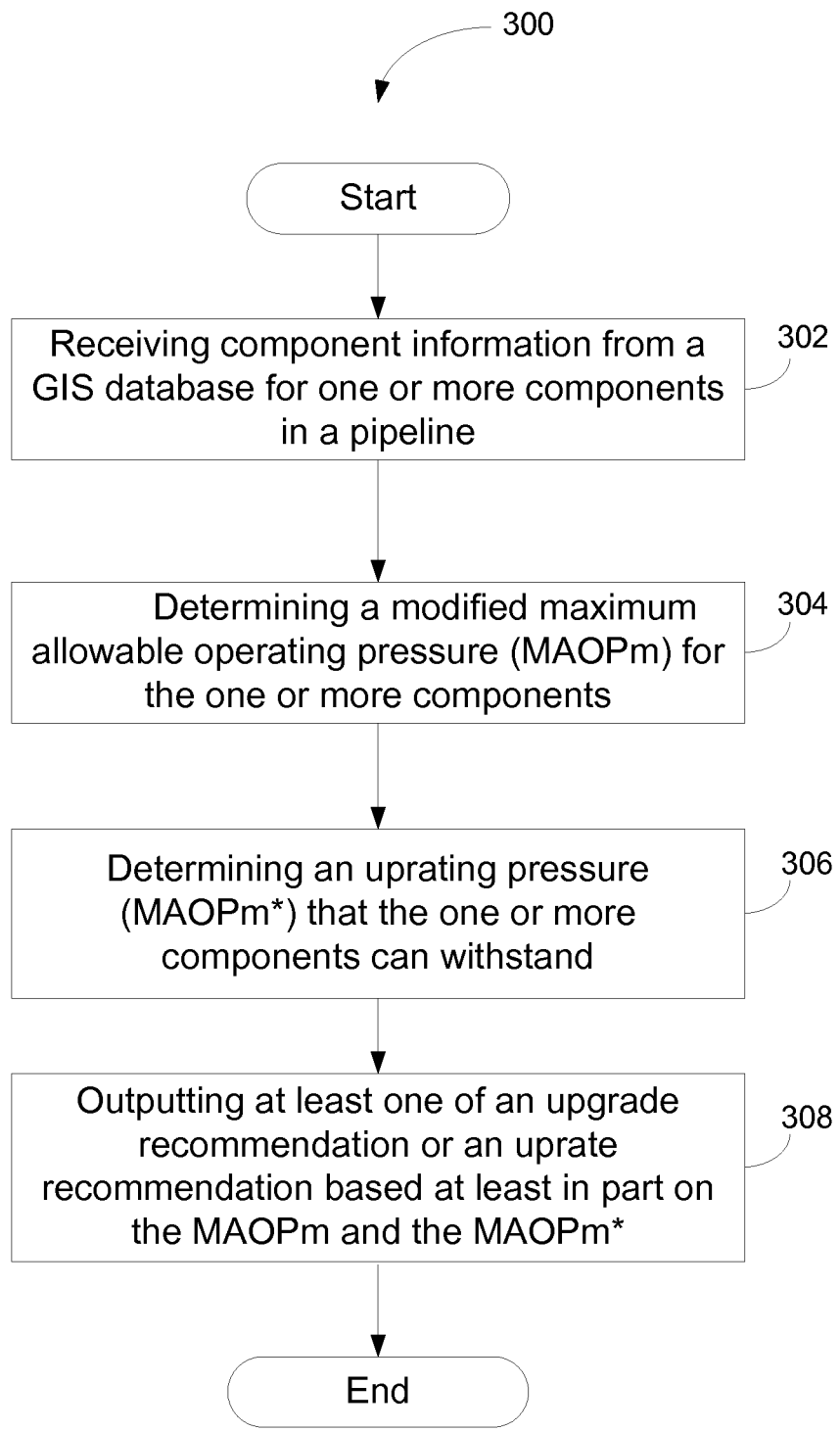
FIG. 3 is a flow diagram of an example method according to an example embodiment of the invention.

An example method 300 for evaluating a pipeline using geographical information system (GIS) data will now be described with reference to the flowchart of FIG. 3. The method 300 starts in block 302 and includes receiving component information from a GIS database for one or more components in a pipeline. In block 304 and according to an example embodiment of the invention, the method 300 includes determining a modified maximum allowable operating pressure (MAOPm) for the one or more components. In block 306, and according to an example embodiment, the method 300 includes determining an uprating pressure (MAOPm*) that the one or more components can withstand. In block 308, and according to an example embodiment, the method 300 includes outputting an upgrade recommendation or an uprate recommendation based at least in part on the MAOPm and the MAOPm*. The method 300 ends after block 308.

According to example embodiments of the invention, receiving component information from the GIS database may include receiving one or more of: component location, corrosion rate 204, component wall thickness 210, maximum allowable operating pressure (MAOP), maximum operating pressure (MOP), fault history 228, or trends. In an example embodiment, determining the modified maximum allowable operating pressure (MAOPm) 212 may include determining a modified specified minimum yield strength (SMYSm) 213 based at least in part on a corrosion rate 204 or an estimated component wall thickness 210 of the one or more components. According to an example embodiment, determining an estimated component wall thickness (210) may be based at least in part on a corrosion rate 204 associated with the one or more components. In an example embodiment, a health status of the one or more components may be determined based at least in part on the on the determined MAOPm 212, and health status may be output.

According to an example embodiment, uprating pressure (MAOPm*) may be derived at least in part from a corrosion rate 204 associated with the one or more components. In accordance with certain example embodiments, outputting the upgrade recommendation 230 may be based at least in part upon one or more of the following being false: maximum operating pressure (MOP)<MAOPm; expected maximum operating pressure (MOPe)<MAOPm; and minimum prediction limit<weak asset prediction<maximum prediction limit. In an example embodiment, outputting the upgrade recommendation 230 may be further based on one or more of: rules, trends, patterns, or fault history associated with the one or more components.

According to an example embodiment, outputting the uprate recommendation 232 may be based at least in part upon all of following being true: maximum operating pressure (MOP)<MAOPm; expected maximum operating pressure (MOPe)<MAOPm; and minimum prediction limit<weak asset prediction<maximum prediction limit. In an example embodiment, outputting the uprate recommendation 232 may further be based on rules, trends, patterns, or fault history associated with the one or more components.

Accordingly, example embodiments of the invention can provide the technical effects of creating certain systems and methods that provide a direct cost benefit to utilities by providing an efficient analysis and recommendation for uprating or upgrading. Example embodiments of the invention can provide the further technical effects of providing systems and methods that predict and maintain the integrity of the pipeline network. Example embodiments of the invention can provide the further technical effects of providing systems and methods that provide load analysis on a pipe to allow the utility to analyze the current health of the pipes with respect to the load.

In example embodiments of the invention, the GIS enabled pipeline evaluation system 100 may include any number of hardware and/or software applications that are executed to facilitate any of the operations. In example embodiments, one or more I/O interfaces may facilitate communication between the GIS enabled pipeline evaluation system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the GIS enabled pipeline evaluation system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the GIS enabled pipeline evaluation system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a BLUETOOTH™ (owned by Telefonaktiebolaget LM Ericsson) enabled network (wireless technology standard for exchanging data over short distances (using short-wavelength radio transmissions in the ISM band from 2400-2480 MHz) from fixed and mobile devices, creating personal area networks (PANs) with high levels of security), a WI-FI™ (owned by Wi-Fi Alliance) enabled network (allows an electronic device to exchange data wirelessly (using radio waves) over a computer network), a satellite-based network any wired network, any wireless network, etc., for communication with external devices and/or systems.

As desired, embodiments of the invention may include the GIS enabled pipeline evaluation system 100 and the pipeline evaluation process 200 with more or less of the components or elements illustrated in FIGS. 1 and 2.

The invention is described above with reference to block and flow diagrams of systems and methods, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for evaluating a pipeline using geographical information system (GIS) data, comprising:
   receiving component information from a GIS database for one or more components in a pipeline;
   determining a modified maximum allowable operating pressure (MAOPm) for the one or more components;
   determining an uprating pressure (MAOPm*) that the one or more components can withstand; and
   outputting at least one of an upgrade recommendation or an uprate recommendation based at least in part on the MAOPm and the MAOPm*.

2. The method of claim 1, wherein receiving the component information comprises receiving one or more of: component location, corrosion rate, component wall thickness, maximum allowable operating pressure (MAOP), maximum operating pressure (MOP), fault history, or trends.

3. The method of claim 1, wherein determining the modified maximum allowable operating pressure (MAOPm) comprises determining a modified specified minimum yield strength (SMYSm) based at least in part on a corrosion rate or an estimated component wall thickness of the one or more components.

4. The method of claim 1, further comprising determining an estimated component wall thickness based at least in part on a corrosion rate associated with the one or more components.

5. The method of claim 1, wherein determining the uprating pressure (MAOPm*) is derived at least in part from a corrosion rate associated with the one or more components.

6. The method of claim 1, further determining a health status of the one or more components based at least in part on the on the determined MAOPm, and outputting the health status.

7. The method of claim 1, wherein outputting the upgrade recommendation is based at least in part upon one or more of the following being false:
   maximum operating pressure (MOP)<MAOPm;
   expected maximum operating pressure (MOPe) <MAOPm;
   minimum prediction limit<weak asset prediction<maximum prediction limit.

8. The method of claim 7, further comprising outputting the upgrade recommendation based on one or more of: rules, trends, patterns, or fault history associated with the one or more components.

9. The method of claim 1, wherein outputting the uprate recommendation is based at least in part upon all of following being true:
   maximum operating pressure (MOP)<MAOPm;
   expected maximum operating pressure (MOPe) <MAOPm; and
   minimum prediction limit<weak asset prediction<maximum prediction limit.

10. The method of claim 9, further comprising outputting the uprate recommendation based on rules, trends, patterns, or fault history associated with the one or more components.

11. A system for evaluating pipeline using geographical information system (GIS) data, comprising:
   at least one memory for storing data and computer-executable instructions; and
   at least one processor configured to access the at least one memory and further configured to execute the computer-executable instructions for:
      receiving component information from a GIS database for one or more components in a pipeline;
      determining a modified maximum allowable operating pressure (MAOPm) for the one or more components;
      determining an uprating pressure (MAOPm*) that the one or more components can withstand; and
      outputting at least one of an upgrade recommendation or an uprate recommendation based at least in part on the MAOPm and the MAOPm*.

12. The system of claim 11, wherein receiving the component information comprises receiving one or more of: component location, corrosion rate, component wall thickness, maximum allowable operating pressure (MAOP), maximum operating pressure (MOP), fault history, or trends.

13. The system of claim 11, wherein determining the modified maximum allowable operating pressure (MAOPm) comprises determining a modified specified minimum yield strength (SMYSm) based at least in part on a corrosion rate or an estimated component wall thickness of the one or more components.

14. The system of claim 11, wherein the at least one processor is further configured for determining an estimated component wall thickness based at least in part on a corrosion rate associated with the one or more components.

15. The system of claim 11, wherein determining the uprating pressure (MAOPm*) is derived at least in part from a corrosion rate associated with the one or more components.

16. The system of claim 11, wherein outputting the upgrade recommendation is based at least in part upon one or more of the following being false:
   maximum operating pressure (MOP)<MAOPm;
   expected maximum operating pressure (MOPe) <MAOPm; and
   minimum prediction limit<weak asset prediction<maximum prediction limit.

17. The system of claim 11, wherein the at least one processor is further configured for outputting the upgrade recommendation based on one or more of: rules, trends, patterns, or fault history associated with the one or more components.

18. The system of claim 11, wherein the at least one processor is further configured for determining a health status of the one or more components based at least in part on the determined MAOPm, and outputting the health status.

19. The system of claim 11, wherein outputting the uprate recommendation is based at least in part upon all of following being true:
   maximum operating pressure(MOP)<MAOPm;
   expected maximum operating pressure (MOPe) <MAOPm; and
   minimum prediction limit<weak asset prediction<maximum prediction limit.

20. The system of claim 19, wherein the at least one processor is further configured for outputting the uprate recommendation based on rules, trends, patterns, or fault history associated with the one or more components.

* * * * *